US008934405B2

(12) United States Patent
Rosenqvist et al.

(10) Patent No.: US 8,934,405 B2
(45) Date of Patent: Jan. 13, 2015

(54) METHOD AND APPARATUS FOR RETRANSMISSION SCHEDULING AND CONTROL IN MULTI-CARRIER WIRELESS COMMUNICATION NETWORKS

(75) Inventors: Anders Rosenqvist, Södra Sandby (SE); Matthias Kamuf, Lund (SE); Bengt Lindoff, Bjärred (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1472 days.

(21) Appl. No.: 12/323,092

(22) Filed: Nov. 25, 2008

(65) Prior Publication Data

US 2009/0279480 A1    Nov. 12, 2009

Related U.S. Application Data

(60) Provisional application No. 61/050,748, filed on May 6, 2008.

(51) Int. Cl.
*H04W 4/00* (2009.01)
*H04J 3/00* (2006.01)
(Continued)

(52) U.S. Cl.
CPC ............ *H04L 1/1893* (2013.01); *H04L 1/1887* (2013.01); *H04L 5/0007* (2013.01); *H04L 5/0064* (2013.01); *H04L 5/0075* (2013.01);
(Continued)

(58) Field of Classification Search
CPC .................................................... H04W 80/04
USPC .......... 370/330, 485, 336, 329, 236, 380, 312
See application file for complete search history.

(56) References Cited

U.S. PATENT DOCUMENTS

2005/0207345 A1* 9/2005 Onggosanusi et al. ....... 370/236
2006/0092875 A1* 5/2006 Yang et al. .................... 370/329
(Continued)

FOREIGN PATENT DOCUMENTS

WO    2007/148138 A1    12/2007

OTHER PUBLICATIONS

Doppler, K. et al. "Multi-Band Scheduler for Future Communication Systems." International Conference on Wireless Communications, Networking and Mobile Computing, 2007 (WiCom 2007), Sep. 21-25, 2007, pp. 6744-6748.

*Primary Examiner* — Kiet Tang
(74) *Attorney, Agent, or Firm* — Coats & Bennett, P.L.L.C.

(57) ABSTRACT

In one embodiment, a method of scheduling transmissions for a base station in a multi-carrier wireless communication network comprises scheduling initial transmissions of data packets for one or more users on a first carrier, without reserving scheduling capacity on the first carrier for retransmissions. Doing so increases the scheduled capacity of the first carrier for initial transmissions. The method further includes scheduling retransmissions, as needed, for given ones of the data packets on one or more second carriers. The method allows more traffic to be scheduled on the first carrier, meaning that multi-carrier transmissions are less frequently needed to convey all of the traffic targeted to one or more receivers. Those receivers therefore spend more time operating with a reduced receiver bandwidth (as compared to the bandwidth required for receiving more than one carrier), which reduces operating power.

14 Claims, 4 Drawing Sheets

(51) Int. Cl.
  *H04J 1/00* (2006.01)
  *H04J 1/16* (2006.01)
  *H04L 1/18* (2006.01)
  *H04L 5/00* (2006.01)
  *H04L 25/02* (2006.01)
  *H04L 25/03* (2006.01)
  *H04L 1/00* (2006.01)
  *H04W 72/12* (2009.01)

(52) U.S. Cl.
  CPC ............. *H04L 5/0087* (2013.01); *H04L 5/0042* (2013.01); *H04L 5/006* (2013.01); *H04L 25/0228* (2013.01); *H04L 25/03159* (2013.01); *H04L 2001/0093* (2013.01); *H04W 72/12* (2013.01)
  USPC ........... 370/328; 370/329; 370/330; 370/336; 370/485; 370/236

(56) References Cited

U.S. PATENT DOCUMENTS

| | | |
|---|---|---|
| 2006/0104374 A1 | 5/2006 | Frederiksen et al. |
| 2006/0251031 A1 | 11/2006 | Anderson et al. |
| 2006/0274712 A1* | 12/2006 | Malladi et al. ................. 370/345 |
| 2007/0008934 A1 | 1/2007 | Balasubramanian et al. |
| 2007/0127516 A1 | 6/2007 | Czaja et al. |
| 2007/0171900 A1* | 7/2007 | Beshai et al. ................. 370/380 |
| 2008/0095174 A1* | 4/2008 | Oksman et al. ........... 370/395.41 |
| 2008/0133995 A1 | 6/2008 | Lohr et al. |
| 2008/0139113 A1 | 6/2008 | Ho et al. |
| 2008/0144572 A1 | 6/2008 | Makhijani |
| 2008/0165806 A1* | 7/2008 | Reznik et al. ................. 370/485 |
| 2008/0198803 A1 | 8/2008 | Lee et al. |
| 2009/0010196 A1* | 1/2009 | Bui et al. ....................... 370/312 |
| 2009/0252125 A1* | 10/2009 | Vujcic ........................... 370/336 |
| 2009/0300456 A1* | 12/2009 | Pelletier et al. ............... 714/749 |
| 2010/0284364 A1* | 11/2010 | You et al. ...................... 370/330 |
| 2010/0290410 A1* | 11/2010 | Haartsen ....................... 370/329 |

* cited by examiner

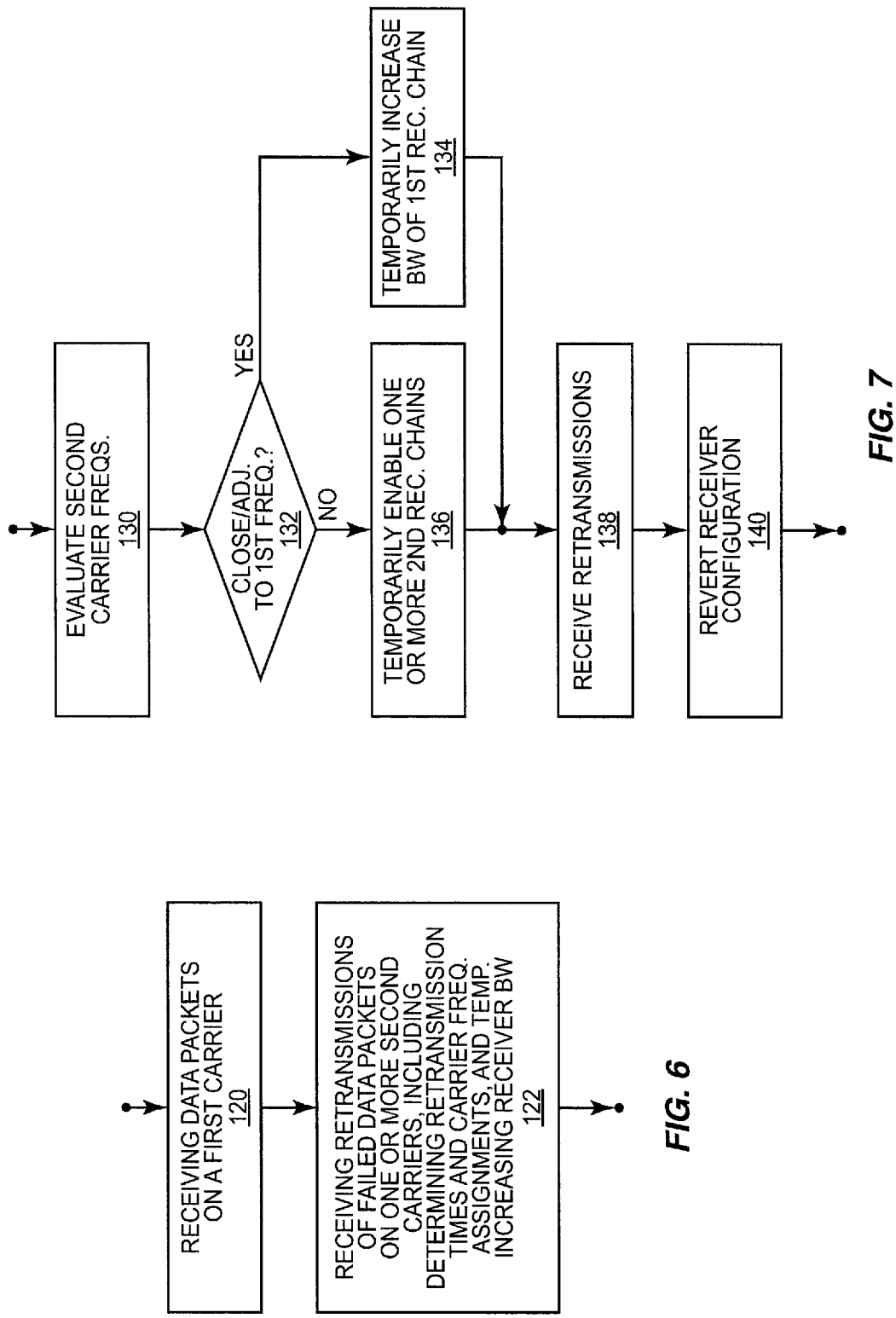

METHOD AND APPARATUS FOR RETRANSMISSION SCHEDULING AND CONTROL IN MULTI-CARRIER WIRELESS COMMUNICATION NETWORKS

RELATED APPLICATIONS

This application claims priority under 35 U.S.C. §119(e) from the U.S. Provisional Patent Application Ser. No. 61/050,748, which was filed on 6 May 2008 and entitled "HARQ Procedures in Multi-carrier LTE/HSPA."

TECHNICAL FIELD

The present invention generally relates to wireless communications, and particularly relates to retransmission scheduling and control in multi-carrier wireless communication networks, e.g., Hybrid Automatic Repeat Request (HARQ) in multi-carrier networks based on Third Generation Partnership Project (3GPP) Long Term Evolution (LTE) and High Speed Packet Access (HSPA) standards.

BACKGROUND

Data rate increases are key goals in developing cellular system standards, such as LTE and HSPA. Higher data rates typically require larger system bandwidths, such as the 100 MHz bandwidth being considered for use in IMT-Advanced (a fourth-generation (4G) communications standard under development by the International Telecommunications Union or ITU. Finding large swaths of contiguous radio frequency spectrum is difficult, however, because the spectrum is a limited resource that is shared by many different operators, running a variety of communication system types.

Aggregating contiguous and non-contiguous spectrum yields larger "system" bandwidths, at least from a baseband perspective. Spectrum aggregation thus provides one mechanism for realizing system bandwidths sufficiently large for supporting dramatically higher maximum data rates in 4G, such as 1 Gbps and above. Aggregation also provides advantages in terms of allowing spectrum adaptations to suit the needs of a particular situation and geographic location.

Current cellular systems, such as LTE, can be evolved to use non-contiguous spectrum through the introduction of multi-carrier transmission. With multi-carrier LTE, several non-contiguous portions of radio frequency spectrum can be allocated, with each portion supporting a "legacy" LTE system. With this arrangement, a 4G access terminal receives data on the aggregate of two or more LTE carriers, transmitted at different frequencies, and possibly with different carrier bandwidths. Note that the term "LTE carrier" denotes the composite of a potentially large number of OFDMA sub carriers defined within a given OFDMA frequency bandwidth. Thus, two LTE carriers at different carrier frequencies means two different sets of OFDMA sub carriers positioned at different bands in the radio frequency spectrum.

While aggregation allows for large system bandwidths, it can complicate receiver design and operation. For example, a single receiver chain practically may not have sufficient bandwidth to receive all of the aggregated portions of radio frequency spectrum. This prospect is even more likely where the aggregated spectrum is non-contiguous. With the implementation of wireless communication receivers with multiple receiver chains, each being tunable to a different portion of the aggregated spectrum, the use of multiple receiver chains increases power consumption in the general case, and thus is undesirable for access devices where battery life is a chief performance concern. Such access devices include mobile terminals, such as cellular radiotelephones, PDAs, pagers, etc.

Thus, for mobile device battery management reasons, it is desirable to manage transmissions that minimize the number of active receiver chains needed at given mobile stations. A wireless communication system working according to that principle will try to collect all traffic to a specific user within a specific spectrum part. If there are multicast transmissions going on in a certain spectrum part, e.g., TV channels, then that part of the spectrum will be particularly attractive for users that simultaneously use TV and data traffic services. For the benefit of these users, the system may want to squeeze as much traffic as possible into that spectrum part.

However, at some point this squeezing will fail, and additional transmissions at one or more other parts of the spectrum are needed. Transmission of this additional data is more costly from an energy point of view, as the receiving UE must activate one or more additional receiver chains, or must otherwise configure itself for reception over a larger bandwidth, and thereby consume more power.

SUMMARY

In one embodiment, a method of scheduling transmissions for a base station in a multi-carrier wireless communication network comprises scheduling initial transmissions of data packets for one or more users on a first carrier, without reserving scheduling capacity on the first carrier for retransmissions. Doing so increases the scheduled capacity of the first carrier for initial transmissions. The method further includes scheduling retransmissions, as needed, for given ones of the data packets on one or more second carriers. Here, the first carrier is at a first carrier frequency, e.g., a first OFDM frequency band or first HSPA carrier frequency, and the one or more second carriers are at second carrier frequencies.

The above method allows more traffic to be scheduled on the first carrier, meaning that multi-carrier transmissions are less frequently needed to convey all of the traffic targeted to one or more receivers. Correspondingly, these receivers spend more time operating with a reduced receiver bandwidth (as compared to the bandwidth required for receiving more than one carrier). Doing so reduces receiver power, which is advantageous in battery-powered receivers, for example.

Complementing the above method, another embodiment provides a base station configured to schedule transmissions in a multi-carrier wireless communication network. The base station comprises transmission circuits configured to transmit on more than one carrier, including a first carrier and one or more second carriers, and a scheduling processor. The scheduling processor is configured to schedule initial transmissions of data packets for one or more users on the first carrier without reserving scheduling capacity on the first carrier for retransmissions, to thereby increase scheduled capacity of the first carrier for initial transmissions. The scheduling processor is further configured to schedule retransmissions, as needed, for given ones of the data packets on one or more of the second carriers. The first carrier is at a first carrier frequency and the one or more second carriers are at second carrier frequencies, some or all of which may be contiguous or non-contiguous with the first carrier frequency.

With the above base station aspects in mind, another embodiment presented herein provides a method of operation for an access terminal in a multi-carrier wireless communication network that includes receiving data packets on a first carrier, and receiving retransmissions of failed data packets on one or more second carriers by determining carrier frequency assignments and retransmission times for the retransmissions and temporarily increasing a reception bandwidth of the access terminal to enable reception of the one or more second carriers in addition to the first carrier.

Correspondingly, an access terminal configured for operation in a multi-carrier wireless communication network comprises a receiver configured to receive data packets on a first carrier and to receive retransmissions of failed data packets on one or more second carriers. The receiver further includes a retransmission controller that is configured to determine carrier frequency assignments and retransmission times for the retransmissions and temporarily increase a reception bandwidth of the access terminal to enable reception of the one or more second carriers in addition to the first carrier. Depending on the terminal's implementation, the retransmission controller increases reception bandwidth by activating one or more additional receiver chains, each tuned to a desired carrier frequency, or by increasing the reception bandwidth of a currently active receiver chain as needed to receive one or more additional carriers.

However, the present invention is not limited to the above summary of features and advantages. Indeed, those skilled in the art will recognize additional features and advantages upon reading the following detailed description, and upon viewing the accompanying drawings.

BRIEF DESCRIPTION OF THE DRAWINGS

FIG. 6 is a logic flow diagram of one embodiment of a method of initial transmission and retransmission reception at a multi-cast access terminal.

FIG. 7 is a logic flow diagram of one embodiment of a method of adjusting receiver bandwidth for reception of retransmissions.

DETAILED DESCRIPTION

Figure 1:
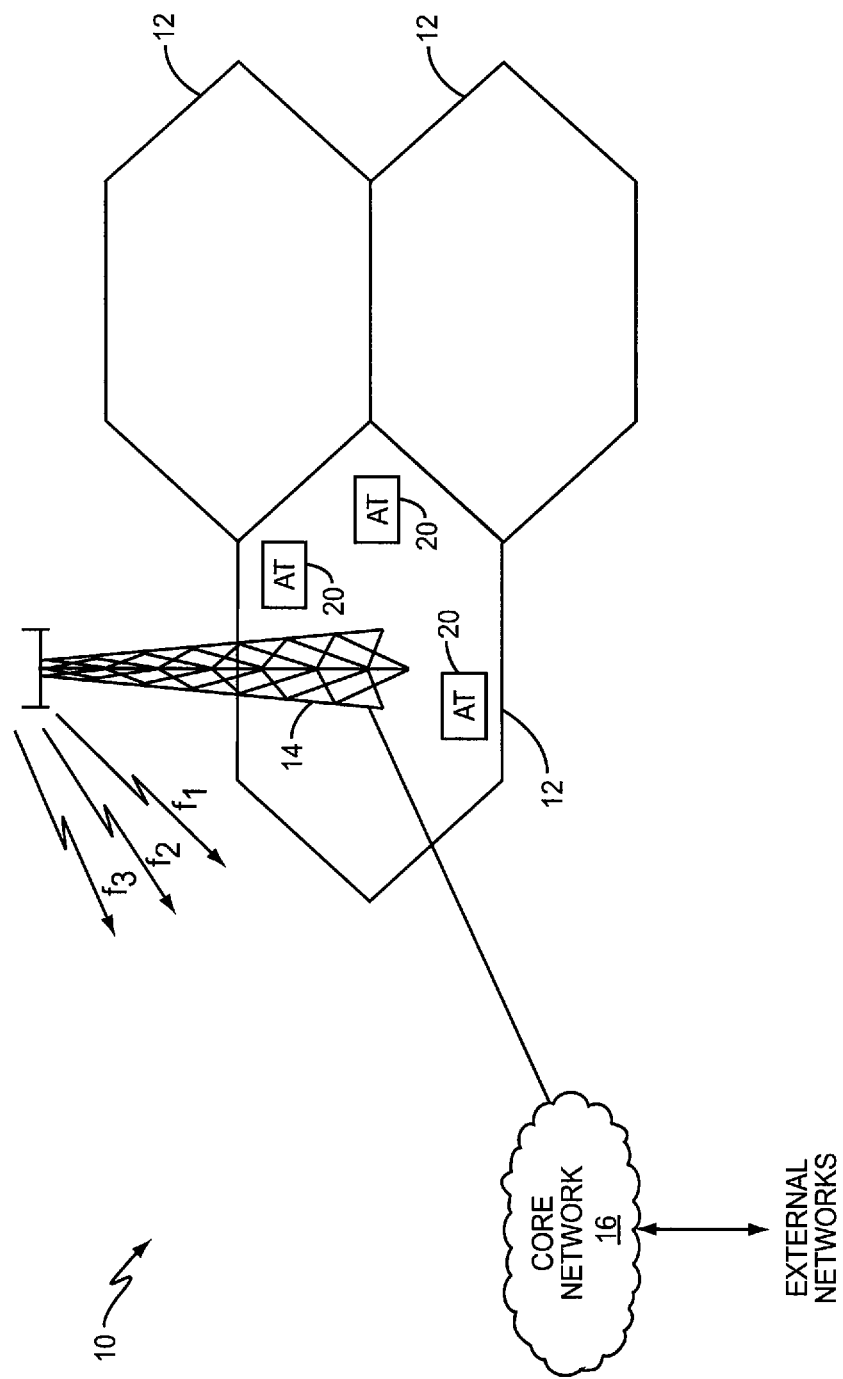
FIG. 1 is block diagram of one embodiment of a multi-carrier wireless communication network, including a multi-carrier base station.

FIG. 1 is a block diagram illustrating one embodiment of a wireless communication network 10, which includes a number of cells or sectors 12 served by one or more base stations 14. The base stations 14—only one is shown for simplicity—communicatively couple to a core network (CN) 16, which in turn provides communicative coupling to one or more external networks, such as the Internet. Access terminals 20 thus can communicate with other access terminals operating within the network 10, operating within other networks (not shown), and/or with other communication devices accessible through the external network(s).

The base station 14 is a multi-carrier base station, meaning that it is configured to transmit wireless communication signals to users (i.e., access terminals 20) using more than one carrier frequency. Three frequencies, f1, f2, and f3 are illustrated by way of non-limiting example. In a Wideband CDMA (WCDMA) embodiment of the network 10 and the base station 14, f1, f2, and f3 denote three different frequencies for HSPA services. In an LTE embodiment of the network 10 and the base station 14, f1, f2, and f3 denote three different OFDMA frequency bandwidths or allocations, each including a set of OFDMA sub-carriers at individual sub-carrier frequencies within the OFDMA frequency bandwidth. Of course, these are to be understood as non-limiting examples of the multi-carrier base station 14, and the teachings herein may be applied to other multi-carrier implementations.

Figure 2:
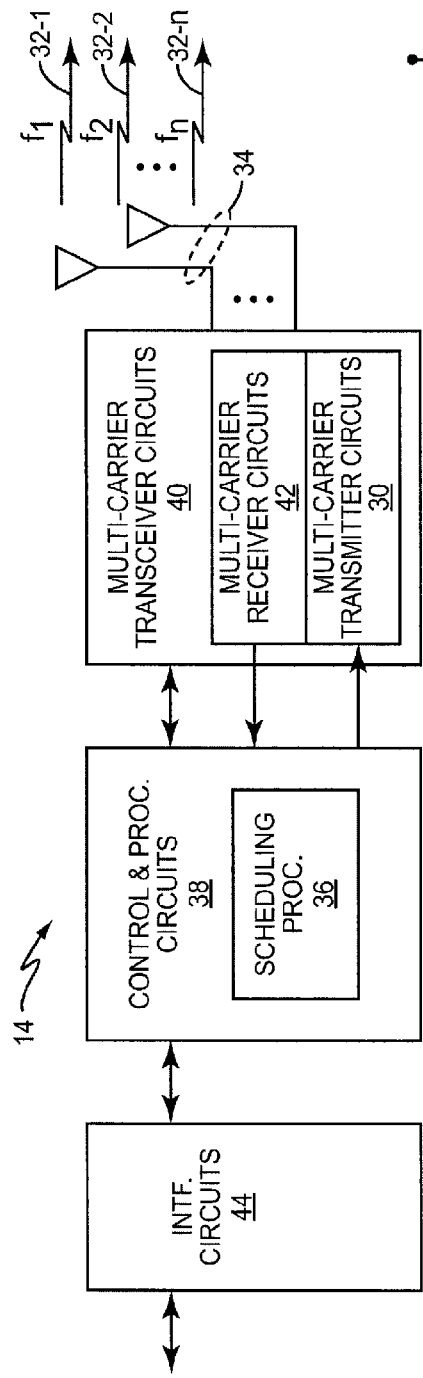
FIG. 2 is a block diagram of one embodiment of a multi-carrier base station.

As another non-limiting example, FIG. 2 is a block diagram illustrating one embodiment of the base station 14, with regard to its functional processing and control elements. The illustrated base station 14 is configured to schedule transmissions in a multi-carrier wireless communication network (network 10), and it comprises transmission circuits 30 configured to transmit on more than one carrier, including a first carrier 32-1 and one or more second carriers 32-2, ..., 32-n. Each carrier is at a different carrier frequency (f1, f2, ..., fn), and the base station 14 includes one or more transmit antennas 34, to support such transmissions.

The illustrated base station 14 further includes a scheduling processor 36 that is configured to schedule initial transmissions of data packets for one or more users on the first carrier 32-1 without reserving scheduling capacity on the first carrier 32-1 for retransmissions, to thereby increase scheduled capacity of the first carrier 32-1 for initial transmissions, and further configured to schedule retransmissions, as needed, for given ones of the data packets on one or more of the second carriers 32-2, ..., 32-n.

For completeness, the scheduling processor 36 is shown in association with, or as part of an overall set of control and processing circuits 38, which are coupled to multi-carrier transmitter circuits 40 that include the aforementioned multi-carrier transmitter circuits 30, along with multi-carrier receiver circuits 42. The control and processing circuits 38 are also coupled to interface circuits 44, which include interface circuits as are known for coupling the base station 14 to, among other things, the CN 16. Those skilled in the art will appreciate that in one or more embodiments the control and processing circuits 38 comprise one or more computer systems, having associated computer programs stored therewith to implement base station call processing and control functions.

Figure 3:
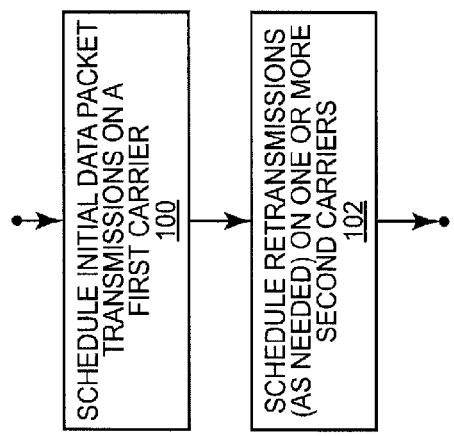
FIG. 3 is a logic flow diagram of one embodiment of a method of base station retransmission scheduling.

In this context, it will be appreciated that the scheduling processor 36 in one or more embodiments comprises a digital processing circuit that is programmed or otherwise configured to implement a multi-carrier scheduling algorithm according to the teachings presented in this disclosure. FIG. 3 provides a non-limiting example of that algorithm according to one embodiment. The algorithm implementing the desired method includes scheduling initial transmissions of data packets for one or more users on a first carrier without reserving scheduling capacity on the first carrier 32-1 for retransmissions (Block 100), to thereby increase scheduled capacity of the first carrier 32-1 for initial transmissions, and scheduling retransmissions, as needed, for given ones of the data packets on one or more second carriers 32-2, ..., 32-n (Block 102). Those skilled in the art will recognize that, at least in some implementations and for any given access terminal 20, any one of the available carriers 32-1, ..., 32-n can be considered a "first carrier," and any one or more of the remaining carriers can be considered the "one or more second carriers."

Those skilled in the art will also appreciate that the processing carried out by the base station 14, e.g., by the scheduling processor 36 and the overall control and processing circuits 38, may be performed by execution of a computer program comprising program instructions stored in a computer readable medium—disc, FLASH, etc. Also, it should be understood that the processing carried out for implementation of the algorithm illustrated in FIG. 3 may be done in conjunction with or as part of other call control and processing functions.

Figure 4:
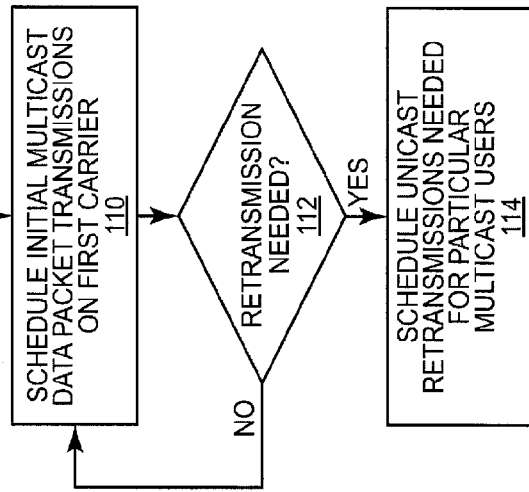
FIG. 4 is a logic flow diagram of one embodiment of a method of multicast transmission supported by unicast retransmissions.

FIG. 4 illustrates another processing algorithm carried out by an embodiment of the base station 14, and it can be understood as a more detailed example of the processing introduced in FIG. 3. Here, scheduling the initial transmissions of data packets for the one or more users on a first carrier 32-1 comprises reserving or otherwise dedicating the first carrier 32-1 to multicast data packets and using the one or more second carriers 32-2, . . . , 32-n for unicast retransmissions of given multicast data packets that were not successfully received by one or more multicast users. Accordingly, the illustrated algorithm includes scheduling initial multicast data packet transmissions on the first carrier 32-1 (Block 110), and determining whether retransmission is needed (Block 112). If so (yes from Block 112), the algorithm includes scheduling unicast retransmissions as needed for particular multicast users (Block 114).

Those skilled in the art will appreciate that the above processing occurs on an ongoing basis, and that at least some aspects of the processing occur in conjunction with each other. For example, unicast retransmissions and/or the determination of whether retransmissions are needed can occur in conjunction with continuing scheduling multicast transmissions. Those skilled in the art will also appreciate that "multicast transmission" generally connotes a transmission targeted to more than one user, e.g., a group of users, while unicast transmission denotes a transmission targeted to one particular user, e.g., the particular user that failed to receive a given data packet in the multicast transmission.

In the same or other embodiments, the network 10 comprises a multi-carrier LTE network or a multi-carrier HSPA network, and scheduling initial transmissions of data packets on a first carrier comprises scheduling the initial transmissions on a first LTE or HSPA carrier, and wherein scheduling retransmissions comprises scheduling the retransmissions, as needed, on one or more additional LTE or HSPA carriers.

Further, in the same or other embodiments, for a given retransmission of a data packet initially transmitted on the first carrier, scheduling retransmissions includes scheduling the retransmission on a given second carrier at a known, fixed delay relative to the initial transmission. Doing so reduces retransmission signaling, for example, because the fixed delay can be signaled once to the various access terminals 20, and then used by them without further signaling (unless the fixed delay needs to be changed). Of course, in one or more embodiments contemplated herein, the base station 14 signals to the one or more users information regarding at least one of carrier frequency assignments and retransmission times, for given retransmissions. That is, the base station 14 signals one or more of the access terminals 20, such as a defined control channel, the carrier frequency assignments and/or the retransmission times that are used for retransmission of failed data packets on the one or more second carriers. Such signaling can be done or updated as often as needed for retransmission parameter changes, etc.

The above embodiments are implemented through appropriate configuration of the base station 14, such as by programming the scheduling processor 36 and/or one or more other elements in the control and processing circuits 38 via stored computer program instructions. It should also be understood that the scheduling processor 36 in one or more embodiments implements additional scheduling functions, such as underlying per-user scheduling operations. These additional scheduling operations may be based on maximizing overall system throughput on the downlink, e.g., maximum Carrier-to-Interference Ratio scheduling, wherein users in the best radio conditions are favored, or may implement proportional-fair scheduling, wherein users in better conditions are favored, but all users are scheduled according to some minimum fairness criteria.

Of course, all such user-specific scheduling may be constrained or otherwise dictated by the types of data being transmitted, or, more generally, by the QoS requirements at issue. These lower-level scheduling details are not germane to understanding the scheduling method and apparatus taught herein, which teach that, however individual user transmissions are scheduled, initial transmissions of packet data traffic for one or more users can be targeted to a given carrier in a multi-carrier system without the conventional step of reserving some scheduled capacity on that carrier based on the expected need for retransmissions. Instead, retransmissions are "shifted" to one or more other carriers. Doing so allows more initial data transmissions on the single carrier, making it more likely that given access terminals 20 can operate in single-carrier mode, rather than in multi-carrier mode.

Figure 5:
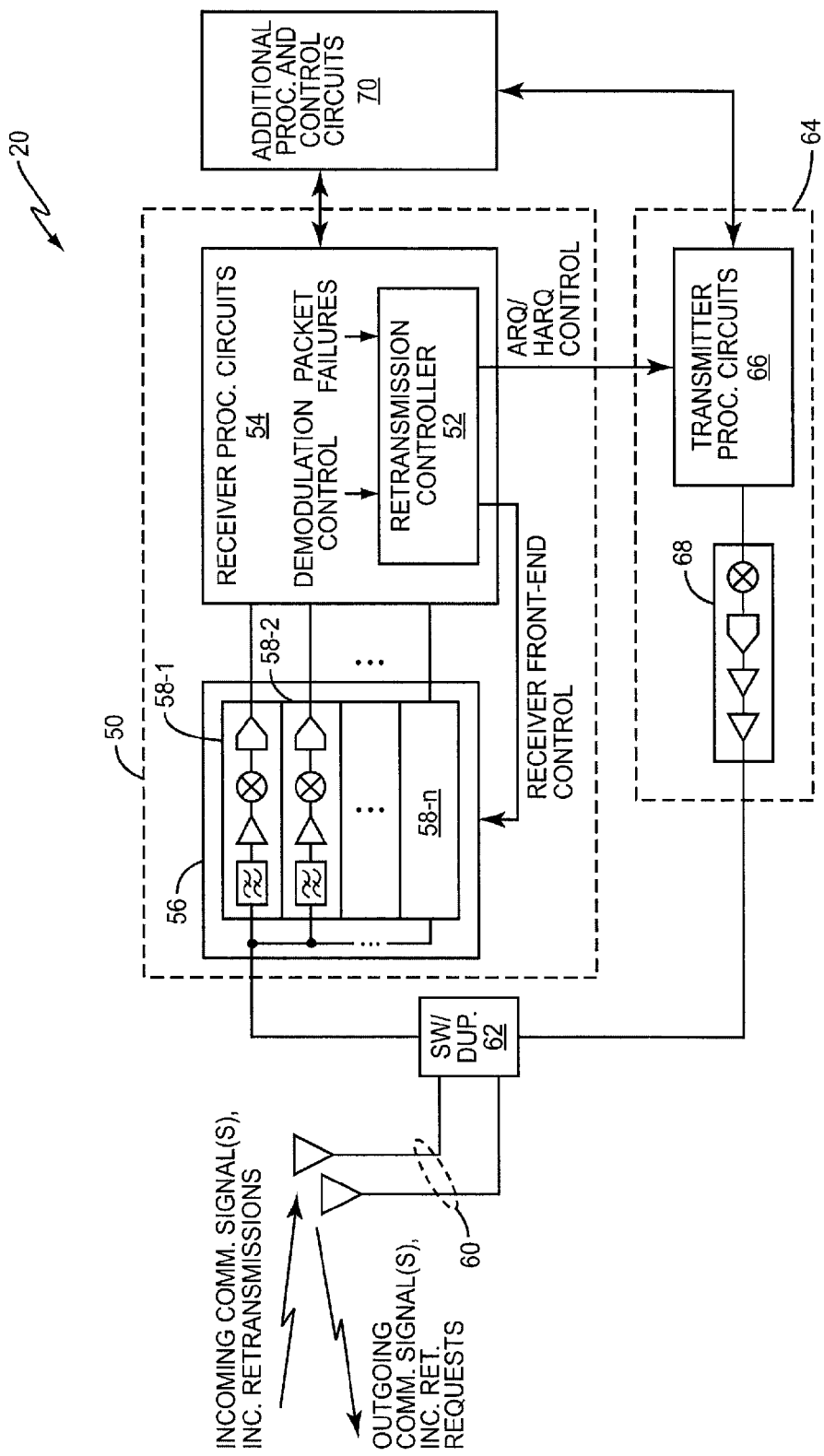
FIG. 5 is a block diagram of one embodiment of a multi-carrier access terminal.

Correspondingly, FIG. 5 is a block diagram of one embodiment of an access terminal 20 that is configured for operation in a multi-carrier wireless communication network. The illustrated access terminal 20 comprises a receiver 50 configured to receive data packets on a first carrier, e.g., carrier 32-1, and to receive retransmissions of failed data packets on one or more second carriers, e.g., one or more of carriers 32-2, . . . , 32-n. The receiver 50 includes a retransmission controller 52 that is configured to determine carrier frequency assignments and retransmission times for the retransmissions, and to temporarily increase a reception bandwidth of the access terminal 20. Doing so enables reception of the one or more second carriers in addition to the first carrier.

In one embodiment of the access terminal 20, the receiver 50 includes receiver processing circuits 54, which include or are associated with the retransmission controller 52. These circuits are, in at least one embodiment, implemented as digital processing circuits and programmed or configured to carry out the specific algorithms taught herein. The receiver 50 further includes a receiver front-end 56, which includes two or more receiver chains 58, shown as receiver chains 58-1, 58-2, . . . , 58-n. As a non-limiting example, a "receiver chain" comprises at least a receiver mixer circuit that can be tuned for the reception of a desired carrier frequency. More practically, each receiver chain 58 may include analog filters, low-noise amplifiers/gain controllers, down-conversion mixers, and analog-to-digital converters (ADCs), as needed to generate streams of digital signal samples corresponding to incoming antenna-received signals.

To that end, the receiver front-end may be coupled to one or more receive antennas 60, such as through a switch/duplexer element 62, to allow antenna sharing with a transmitter 64 of the access terminal 20, which includes transmitter processing circuits 66 (e.g., digital baseband transmission processing circuits), and transmission circuits 68, which may include a modulator, and one or more digital-to-analog converters (DACs), pre-amplifiers, and power amplifiers. Rounding out the illustrated example, the access terminal 20 further includes additional processing and control circuits 70, which may include system controllers, user interface circuits, etc., all depending on the intended use and function of the access terminal.

Turning back to the details of interest with respect to the advantageous multi-carrier operations taught herein, it should be understood that the receiver processing circuits 54 are configured to control the receiver front-end 56, including controlling which ones and how many of the receiver chains 58 are active at any given time, and setting the carrier frequencies and bandwidths to which each such chain is tuned.

FIG. 6 illustrates one embodiment of a processing algorithm implemented by the access terminal 20. The illustrated processing is implemented in hardware, software, or any combination of thereof. For example, in one embodiment, at least a portion of the receiver processing circuits 54 is implemented as a digital processing circuit, e.g., a baseband receiver processor based on a microprocessor, digital signal processor, etc. Those skilled in the art will appreciate that the receiver processing circuits 54 in one or more embodiments include or are associated with memory or other readable media. Such memory stores computer program instructions that implement the illustrated processing, or variations of it.

Such processing "begins" with receiving data packets on a first carrier (Block 120), e.g., the carrier 32-1 as transmitted by the base station 14 at carrier frequency f1. This processing can be understood as an ongoing process, associated with the ongoing reception of packet data traffic for any number of data services that are active at the access terminal 20. To the extent that one or more incoming data packets are not successfully received—e.g., given packets are "failed" packets if they fail Cyclic Redundancy Check (CRC) verification—the access terminal 20 receives retransmissions of failed data packets on one or more second carriers (Block 122).

The processing of Block 122 also can be understood as an ongoing process. Indeed, the processing of Block 122 can be carried out concurrently with that of Block 120, wherein the access terminal 20 receives new packet data on the first carrier, while receiving retransmissions of previously transmitted (but failed) packet data on one or more of the second carriers, e.g., carrier 32-2 at carrier frequency f2. As part of such processing, the access terminal 20 determines retransmission times and carrier frequency assignments for the retransmissions, and temporarily increases the bandwidth of its receiver 50, as needed, to receive retransmissions at the one or more second carrier frequencies while maintaining reception at the first carrier frequency.

In one embodiment, the retransmission controller 52 is configured to determine the carrier frequency assignments and retransmission times for the retransmissions based on receiving control channel signaling from the network 10, wherein that signaling identifies the one or more second carriers to be used for the retransmissions and the retransmission times for the retransmissions. In another embodiment, the retransmission controller 52 is configured to determine the carrier frequency assignments and retransmission times for the retransmissions by, for a given failed data packet, determining the retransmission time according to a known fixed delay relative to initial transmission of the given failed data packet. The fixed delay can be one or more default values stored in the access terminal 20 and/or the fixed delay can be a signaled value received from the network 10, and stored by the access terminal 20.

In another embodiment, the retransmission controller 52 is configured to determine the carrier frequency assignments and retransmission times for the retransmissions by, for given failed data packets, adaptively deducing the carrier frequency assignments and monitoring control channel information on one or more second carriers corresponding to the deduced carrier frequency assignments. Adaptively deducing the carrier frequency assignments comprises, in one or more embodiments, evaluating channel qualities for a number of second carriers and deducing that one or more best quality ones of the second carriers will be used for retransmissions. Channel qualities may be assessed by the access terminal 20, such as by evaluation of received pilot signal strengths for the different carrier frequencies, assuming that a common pilot channel or other reference signal is transmitted by the base station 14 for each of its multiple carriers 32.

In another embodiment, the retransmission controller 52 is configured to adaptively deduce the carrier frequency assignments by remembering which second carriers were most recently used for retransmissions. Further, in at least one embodiment where the retransmission controller 52 adaptively deduces the (retransmission) carrier frequency assignments, it is configured to receive network signaling indicating which second carriers are candidates for retransmissions. The retransmission controller 52 uses this signaled information to limit the number of second carriers considered in adaptive deduction of the carrier frequency assignments to the candidates.

Regardless of how the access terminal 20 identifies which second carrier(s) it should tune to for retransmission receptions, the receiver processing circuits 54 adjust the bandwidth of the receiver 50, as needed, to receive a single carrier (one active receiver chain 58), or to receive more than one carrier (two or more active receiver chains 58). Also, it should be understood that in at least one embodiment contemplated herein, the receiver front-end 56 includes a receiver chain 58 that has a configurable bandwidth. That is, the bandwidth can be left relatively narrow for reception of one carrier, and increased as needed to receive more than one carrier, although with commensurate increases in receiver power consumption.

Thus, in at least one embodiment, the retransmission controller 52 is configured to temporarily increase the reception bandwidth of the access terminal 20—for multi-carrier reception—by temporarily reconfiguring a first receiver chain 58 of the access terminal to have a reception bandwidth sufficient to receive the one or more second carriers, in addition to receiving the first carrier. That is, assuming a first receiver chain 58 is tuned to receive a first carrier at a first carrier frequency, the retransmission controller 52 reconfigures that first receiver chain 58 so that it also receives one or more second carrier frequencies, to allow reception of retransmitted packets. In another embodiment, a first receiver chain 58 of the access terminal 20 is configured to receive a first carrier, e.g., it is tuned to receive signals at a first carrier frequency, and the retransmission controller 52 temporarily increases the reception bandwidth of the access terminal 20 by temporarily enabling one or more second receiver chains 58 of the access terminal 20, to receive the one or more second carriers.

FIG. 7 illustrates one algorithm for temporarily increasing the (reception) bandwidth of the receiver 50, as needed, to receive packet data retransmissions on one or more second carriers. As with the processing of FIG. 6, at least some of the steps may be performed in a different order than illustrated and/or performed together. Also, as with FIG. 6, the illustrated processing can be carried out in hardware, software, or any combination thereof, such as by a digital processor in the receiver processing circuits 54 executing stored program instructions.

The illustrated processing begins with the assumption that one or more initial data packet transmissions to the access terminal on a first carrier have failed, and the access terminal 20 is preparing to increase the reception bandwidth of its receiver 50, to receive retransmissions of the failed data on one or more second carriers. Thus, processing starts with the access terminal 20 evaluating the second carrier frequency (or frequencies) that will be used for retransmission (Block 130).

If the second carrier frequencies to be used for retransmission are adjacent or close to the first carrier frequency (being used for initial packet data transmissions) (Yes from Block 132), the access terminal 20 temporarily increases the bandwidth of the first receiver chain 58-1 that is being used for reception at the first carrier frequency (Block 134). "Close" in this sense does not necessarily mean that the second carrier frequency or frequencies are contiguous with the first carrier frequency, but it does mean that the frequency or frequencies to be used for data retransmission are near enough to the first carrier frequency that it is practically possible to adjust the reception bandwidth of the first receiver chain 58-1, so that it receives transmissions at the first carrier frequency and at the one or more second carrier frequencies. The bandwidth of the receiver chain 58-1 can be increased, for example, by increasing filter bandwidths of one or more reconfigurable filters in the chain and making corresponding amplifier adjustments if needed, along with changing the down-conversion mixer frequencies.

However, if the one or more second carrier frequencies are not adjacent or close to the first carrier frequency (No from Block 132), the access terminal 20 increases the bandwidth of its receiver 50 not by adjusting the first receiver chain 58-1, but rather by activating one or more of its second receiver chains 58-2, . . . , 58-n (Block 136). Each newly activated receiver chain 58 is tuned to receive a particular one or more of the second frequencies that will be used for the retransmissions.

Regardless of whether the access terminal 20 increased receiver bandwidth by adjusting its first receiver chain 58-1, or by activating one or more of its second receiver chains 58-2, . . . , 58-n, processing continues with reception of the retransmissions (Block 138). After retransmission reception, the access terminal 20 reverts the configuration of its receiver 50 to the single-carrier configuration (Block 140), for continued reception of initial transmissions on the first carrier.

The retransmissions may be based on Hybrid Automatic Repeat reQuest (HARQ) technology, for example. HARQ is well known in the wireless communication arts, and it is important in packet based communication systems because it improves robustness by protecting against link-adaptation inaccuracies. Assume, for example, that the scheduling processor 36 at the base station 14 chooses a modulation-coding scheme in order to achieve a certain (non-zero) BLock Error Rate (BLER) for an initial transmission of a user packet. If the targeted user (targeted access terminal 20) fails to decode the packet, it informs the base station of that failure, e.g., through positive or negative acknowledgements (ACK/NAK), such that a retransmission is initiated.

From the perspective of delay (latency) between the initial transmission of a packet that fails decoding at a targeted access terminal 20 and retransmission of that packet, it will be appreciated that retransmission processing is handled more efficiently at the physical layer. Indeed, the network 10 maintains a maximum round-trip time for transmissions between it and the access terminals 20, and retransmission latency is handled within this overall transmission timing context.

Continuing the example details, the network 10/access terminals 20 may implement Type-I or Type-II HARQ. With Type-I HARQ, the network 10 retransmits the same packet in response to receiving an indication of decoding failure for that packet from a targeted access terminal 20. The access terminal 20 "combines" the originally transmitted packet with the retransmitted packet (Type-I combining), for a resulting gain in signal-to-noise ratio (SNR). With Type-II HARQ, the retransmitted packet is not the initially transmitted Packet Data Unit (PDU), but rather a new data block. The new data block is formed using the original PDU and the error correcting code used for the original PDU, to provide "incremental redundancy" with respect to the original PDU. The access terminal 20 thus uses the original PDU and the incremental redundancy of the new PDU, along with its knowledge of the error correction coding to successfully decode the original PDU.

Regardless of these details, those skilled in the art will recognize the broader, advantageous aspects of the processing taught in one or more embodiments presented herein. In at least one such embodiment, an access terminal 20 communicatively connects with the network 10. During this connection, the network 10 informs the access terminal 20 about the main (or anchor) component carrier, where the initial transmissions of data packets are made. For example, the network 10—via signaling by the base station 14—may indicate to a given access terminal 20 that initial packet data transmissions sent on the downlink to the access terminal 20 will be carried out on carrier 32-1 at carrier frequency f1.

The network 10/base station 14 also provide the access terminal 20 with information about the second (or any other available) component carrier(s), where retransmissions may occur. The access terminal 20 begins receiving initial packet data transmissions on the first carrier and carries out ongoing reception processing of those received packets, including packet decoding. The CRC for each received packet is derived and, if the CRC checks, an ACK may be, but not necessarily, transmitted by the access terminal 20 to the base station 14. Conversely, in the case of a failed CRC check, the access terminal 20 may transmit a NAK to the base station 14, and prepare to receive a corresponding retransmission on another one of the available carrier frequencies.

This preparation may be performed by enabling an additional receiver chain 58-x (where "x" denotes any of the receiver chains 58 not being used to receive initial transmissions on the first carrier), and adapting the newly activated receiver chain(s) to the carrier frequency or frequencies that will be used for retransmission. Alternatively, as noted, the currently active receiver chain 58 can be adjusted, so that its bandwidth is increased for reception of the retransmission carrier frequency or frequencies, in addition to continued reception of the initial transmission carrier frequency. Then the access terminal 20 may simultaneously receive first transmissions of new data packets on the first carrier frequency and retransmissions of NAKed data packets on another carrier frequency. When all retransmitted blocks have resulted in CRC checks, the access terminal 20 disables the additional receiver chains, or otherwise reverts to the reduced bandwidth needed just for reception of the initial transmission carrier frequency. If any retransmissions fail, the access terminal 20 can maintain its expanded receiver bandwidth, request new retransmissions, and receive them.

Assuming a two carrier implementation of the base station 14, carrier 32-1 at carrier frequency f1 may be designated for initial transmissions of data packet traffic to one or more access terminals 20, while carrier 32-2 at carrier frequency f2 is designated for retransmissions of packet data, as needed, to those one or more access terminals 20. As part of this example, one may assume that frequencies f1 and f2 are relatively closely spaced, e.g., offset by 10 MHz or less. In this case, a single receiver chain 58 in a given access terminal 20 can be used to receive the first carrier 32-1 when no retransmissions are being sent, and configured to receive the first and second carriers 32-1 and 32-2 when retransmissions are being sent on carrier 32-2 in conjunction with ongoing initial transmissions on carrier 32-1.

For reception of just the first carrier 32-1, the bandwidth of the receiver chain 58 is adjusted to a first bandwidth (BW1), which generally equals or is otherwise matched to the bandwidth of the first carrier 32-1. The first carrier signal is received and down converted to a baseband signal and filtered through an (analog) selectivity filter and A-to-D converted. The resulting digital signal is then fed to a detector in the receiver processing circuits 54. In an LTE advanced implementation of the access terminal 20, the detector includes a Fast Fourier Transform (FFT) processor and a channel estimator, and is configured to estimate and equalize the frequency domain representation of the radio channel. OFDM symbols received on the first carrier 32-1 are thus equalized, and the equalized symbols are fed to a decoder, which also may be implemented within the digital processing circuitry of the receiver processing circuits 54.

The decoder processes the equalized OFDM symbols to decode the received data packets. If the decoding CRC check is successful, an ACK may be transmitted to the base station 14, or, conversely, a NAK may be transmitted if the CRC check is not successful. Transmission of the NAK initiates retransmission of the failed packet by the base station 14, and the access terminal 20 meanwhile adapts the bandwidth of its receiver 50 for reception of carrier frequency f2, in addition to carrier frequency f1. Digital processing likewise is adapted, for receiving, equalizing, and processing OFDM symbols received on the retransmission carrier 32-2 at carrier frequency f2, in addition to those received on the initial transmission carrier 32-1 at carrier frequency f1.

Of course, as explained earlier, for any given access terminal 20 or group of access terminals, there may be more than one carrier available for use as a retransmission carrier and given access terminals 20 are thus required to determine the frequencies and times to be used for retransmissions. One possible strategy is to monitor some control channel and thereby get the information on when and at which carrier the retransmission will come. Such a strategy is simple but it may lead to control channel congestion if, for example, the base station 14 uses the initial transmission carrier's control channel(s) to carry all such information. On the other hand, if such information is spread or otherwise distributed among the different carriers' control channels, control channel monitoring is complicated from the perspective of the access terminals 20, as they may be obligated to monitor multiple carrier frequencies to ensure reception of all required control channel information. In addition, at least some of the power saving potential would be lost.

As previously noted, therefore, an access terminal 20 as contemplated herein may be configured to intelligently "guess" or otherwise deduce the carrier frequencies and/or times that will be used for retransmissions. For example, the access terminal 20 may be configured to assume that the same carrier at which the most recent successfully decoded retransmission came will be used for a next retransmission. That strategy may be modified by appropriate access terminal configuration, such that the access terminal 20 looks for the retransmissions at an increasing number of carriers (increasing in proportion to, for example, a number of timeouts), in the case that no retransmission is found at the first assumed carrier.

Another strategy used in one or more access terminal embodiments is to monitor the Channel Quality Information (CQI) reports as sent by the access terminal 20 for one or more carriers that are candidates for retransmission use, and to assume that any needed retransmissions will appear at any of the n carriers (except from the main/anchor carrier being used for initial transmissions) with the currently best CQI reports. That strategy may also start with n=1, with the access terminal 20 first looking for retransmissions on the one best carrier, and then increasing the number of carriers it monitors for retransmissions in the case that no retransmission is found on the best carrier.

Of course, another strategy is for the access terminal 20 to receive higher layer messages from time to time or as needed, which convey a list of retransmission candidate carriers. Thus, when a retransmission is needed, the access terminal 20 monitors the control channels of those carriers identified as candidates. This higher layer signaling-based approach can be combined with essentially any of the other strategies, at least as a mechanism for reducing the number of carriers that the access terminal 20 checks for retransmission packets.

Also, as noted, one embodiment is based on sending retransmissions at fixed, known delays relative to the corresponding initial transmissions. Access terminals 20 therefore "know" the time for a given retransmission based on the known offset relative to the failed initial transmission. This approach allows for simpler access terminal implementations and/or less power consumption, and reduced signaling overhead. Indeed, in some types of systems, no control signaling may be needed at all.

As a further approach to reducing control signaling (on either or both the uplink and downlink), the network 10 may be configured to send at least first retransmissions for initially transmitted packet data, if the number of retransmissions per time unit exceeds some defined threshold. For example, a large number of access terminals 20 may be operating in bad radio conditions, or may be operating at high data transmission rates, leaving them more susceptible to decoding errors for given channel conditions.

Also, as noted, it is contemplated herein that a plurality of multicast streams (even streams assigned to different "first" carriers) shares the same retransmission carrier. That is, a given carrier can be designated to carry retransmissions as needed for different multi-cast transmissions being transmitted on more than one other carrier.

Those skilled in the art will appreciate that the access terminals 20 are configured to process initial data packets received in a multi-cast transmission on a given initial transmission carrier concurrently with any retransmission data packets received for that multi-cast transmission on a given retransmission carrier. Consider, for example, a combined unicast and multicast system, where unicast and multicast modes are allocated to specific carriers. As multicast packets are received at a given access terminal 20, the unicast carrier can serve as a dedicated carrier to improve coverage when the decoding of the multicast information failed. In order to enable such functionality, retransmission has to be scheduled for another part of the available transmission spectrum by the scheduling processor 36 of the base station 14, which may be, as noted, a "Node B" or enhanced NodeB (eNodeB) in a multicarrier WCDMA or LTE system. Also, note that it may be required to expand the multi-cast standard, at least on a Node B and access terminal (UE) level. The contemplated expansions will allow HARQ processing to work where the access terminal 20 receives multicast data packets on a multicast downlink carrier at one frequency, sends NAKs as needed on a unicast uplink carrier at the same frequency, and receives retransmissions on a unicast downlink carrier at another frequency.

With these and other example details in mind, those skilled in the wireless communication arts will appreciate that the teachings herein increase a network's data packet scheduling flexibility in a multi-carrier system, e.g., a multi-carrier LTE system, making it possible to improve the entire system performance. The contemplated base station scheduler 36 may, without need for reserving resources on a first carrier for handling random retransmission events, concentrate on squeezing or otherwise packing as much predictable data into the first carrier. Retransmissions, the need for which varies randomly over time, are dealt with on another carrier or carriers.

Furthermore, the teachings presented herein also make it possible for unicast retransmission of packets to dedicated access terminals in a multicast scenario where the first carrier is dedicated to multicast only. In this case, the retransmissions (on demand) on a secondary carrier are used for improving the coverage of the multicast system without changing the scheduling on the first carrier. This arrangement is valuable in providing Multimedia Broadcast over Single Frequency Network (MBSFN) services, where MBSFN multicasting is carried on for one carrier frequency and all needed retransmissions are unicasted on one or more other carrier frequencies.

The proposed retransmission method also allows for the coexistence of newer access terminals that are configured according to the teachings herein, and legacy access terminals that are not. In this latter case, legacy UEs simply would not be aware of the retransmissions occurring on other carriers and same-frequency retransmissions could be provided to them according to conventional retransmission approaches. As for the newer access terminals 20 that are compatible with the other-frequency retransmissions taught herein, allowing them to use different strategies for adjusting receiver bandwidth as needed to receive retransmissions allows those access terminals 20 to save valuable operating power and thereby extend their battery life.

Of course, those skilled in the art will recognize that use as non-limiting. Indeed, the present invention is not limited to the foregoing discussion and accompanying drawings. Instead, the present invention is limited only by the following claims and their legal equivalents.

What is claimed is:

1. A method of operation for an access terminal in a multi-carrier wireless communication network comprising:
   receiving data packets on a first carrier; and
   receiving retransmissions of failed data packets on one or more different, second carriers by:
      determining carrier frequency assignments and retransmission times for the retransmissions; and
      temporarily increasing a reception bandwidth of the access terminal to enable reception of the one or more second carriers in addition to the first carrier;
   wherein a first receiver chain of the access terminal is configured to receive the first carrier; and
   wherein temporarily increasing the reception bandwidth of the access terminal comprises:
      temporarily enabling one or more different, second receiver chains of the access terminal to receive the one or more second carriers; and
      disabling the one or more different, second receiver chains of the access terminal once the retransmissions have been successfully received on the one or more second carriers.

2. The method of claim 1, wherein determining the carrier frequency assignments and retransmission times for the retransmissions comprises receiving control channel signaling from the multi-carrier wireless communication network that identifies the one or more second carriers to be used for the retransmissions, and the retransmission times for the retransmissions.

3. The method of claim 1, wherein determining the carrier frequency assignments and retransmission times for the retransmissions comprises, for a given failed data packet, determining the retransmission time according to a known fixed delay relative to initial transmission of the given failed data packet.

4. The method of claim 1, wherein determining the carrier frequency assignments and retransmission times for the retransmissions comprises, for given failed data packets, adaptively deducing the carrier frequency assignments and monitoring control channel information on one or more second carriers corresponding to the deduced carrier frequency assignments.

5. The method of claim 4, wherein adaptively deducing the carrier frequency assignments comprises evaluating channel qualities for a number of second carriers and deducing that one or more best quality ones of the second carriers will be used for retransmissions.

6. The method of claim 4, wherein adaptively deducing the carrier frequency assignments comprises remembering which second carriers were most recently used for retransmissions.

7. The method of claim 4, further comprising:
   receiving network signaling indicating which second carriers are candidates for retransmissions; and
   limiting the number of second carriers considered in adaptive deduction of the carrier frequency assignments to the candidates.

8. An access terminal configured for operation in a multi-carrier wireless communication network comprising:
   a receiver configured to receive data packets on a first carrier and to receive retransmissions of failed data packets on one or more different, second carriers; and
   said receiver including a retransmission controller circuit configured to:
      determine carrier frequency assignments and retransmission times for the retransmissions; and
      temporarily increase a reception bandwidth of the access terminal to enable reception of the one or more second carriers in addition to the first carrier;
   wherein a first receiver chain of the access terminal is configured to receive the first carrier; and
   wherein to temporarily increase the reception bandwidth of the access terminal, the retransmission controller circuit is configured to:
      temporarily enable one or more different, second receiver chains of the access terminal to receive the one or more second carriers; and
      disable the one or more different, second receiver chains of the access terminal once the retransmissions have been successfully received on the one or more second carriers.

9. The access terminal of claim 8, wherein the retransmission controller circuit is configured to determine the carrier frequency assignments and retransmission times for the retransmissions based on receiving control channel signaling from the multi-carrier wireless communication network that identifies the one or more second carriers to be used for the retransmissions, and the retransmission times for the retransmissions.

10. The access terminal of claim 8, wherein the retransmission controller circuit is configured to determine the carrier frequency assignments and retransmission times for the retransmissions by, for a given failed data packet, determining the retransmission time according to a known fixed delay relative to initial transmission of the given failed data packet.

11. The access terminal of claim 8, wherein the retransmission controller circuit is configured to determine the carrier frequency assignments and retransmission times for the retransmissions by, for given failed data packets, adaptively deducing the carrier frequency assignments and monitoring control channel information on one or more second carriers corresponding to the deduced carrier frequency assignments.

12. The access terminal of claim 11, wherein the retransmission controller circuit is configured to adaptively deduce the carrier frequency assignments by evaluating channel qualities for a number of second carriers and deducing that one or more best quality ones of the second carriers will be used for retransmissions.

13. The access terminal of claim 11, wherein the retransmission controller circuit is configured to adaptively deduce the carrier frequency assignments by remembering which second carriers were most recently used for retransmissions.

14. The access terminal of claim 11, wherein the retransmission controller circuit is configured to receive network signaling indicating which second carriers are candidates for retransmissions and thereby limit the number of second carriers considered in adaptive deduction of the carrier frequency assignments to the candidates.

* * * * *